United States Patent [19]

Dalibard et al.

[11] 4,131,723
[45] Dec. 26, 1978

[54] LEAD STORAGE BATTERY WITH LIMITED EVOLUTION OF GAS

[75] Inventors: Gérard Dalibard, Sevres; Kha M. Pham, Epinay sur Seine, both of France

[73] Assignee: Compagnie Europeenne d'Accumulateurs, Paris, France

[21] Appl. No.: 871,884

[22] Filed: Jan. 24, 1978

[30] Foreign Application Priority Data

Dec. 28, 1977 [FR] France .................. 77 39467

[51] Int. Cl.² ............................................ H01M 10/52
[52] U.S. Cl. ................................. 429/81; 429/163; 429/177; 429/181; 429/59
[58] Field of Search ................ 429/59, 60, 81, 163, 429/177

[56] References Cited

U.S. PATENT DOCUMENTS

| | | | |
|---|---|---|---|
| 1,499,901 | 7/1924 | Anderson | 429/81 |
| 3,502,504 | 3/1970 | White | 429/81 |

*Primary Examiner*—Donald L. Walton
*Attorney, Agent, or Firm*—Sughrue, Rothwell, Mion, Zinn and Macpeak

[57] ABSTRACT

A maintenance-free lead storage battery comprises a container closed by a lid and containing an acid electrolyte together with a block of positive plates, negative plates and separators. The block of plates and separators is tightly packed in a case which is immersed in the electrolyte and which has openings in those of its walls which are in close contact with end ones of said plates.

13 Claims, 1 Drawing Figure

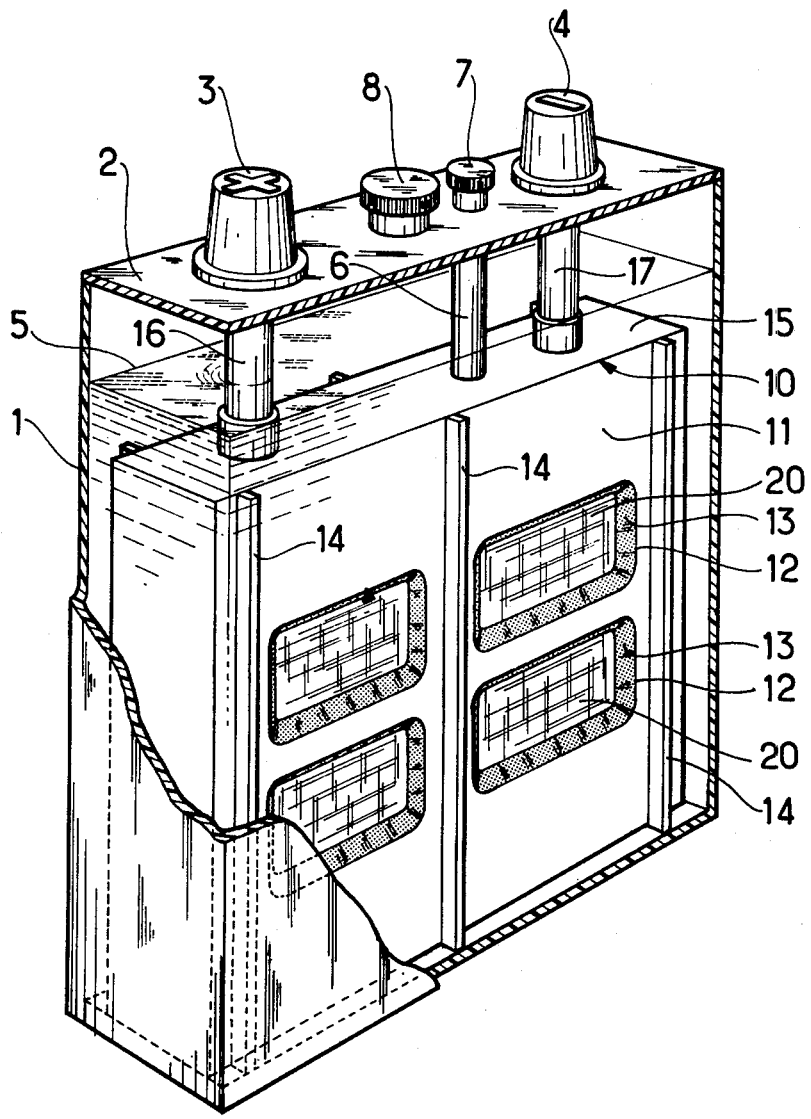

LEAD STORAGE BATTERY WITH LIMITED EVOLUTION OF GAS

FIELD OF THE INVENTION

The invention relates to a lead storage cell with limited evolution of gas, thus requiring minimal maintenance.

BACKGROUND OF THE INVENTION

It is known that the water in a lead storage battery is electrolysed at the end of charging and during overcharging and that it is therefore necessary to monitor the level of the electrolyte and to correct it frequently.

A method for limiting the water consumption at the end of charging and during overcharging is to chemically reduce the evolved oxygen on the negative electrode. For electrochemical reasons the rate at which hydrogen is evolved then becomes very low. So-called "sealed" lead storage batteries have been proposed on this principle. They have a limited quantity of electrolyte which is practically completely retained in the pores of the active material and of the separators which are constituted by non-woven fibres of glass, polyester, etc. Such a storage battery includes a vent which permits it to operate at a high internal pressure, thereby increasing solubility of oxygen in the electrolyte and the speed at which it is reduced on the negative plates.

Sealed storage batteries can be provided which have negligable water consumption, but the fact that a limited quantity of electrolyte is used leads to reduced performance during discharge whether slow or rapid. Further, the containers of these storage batteries must be mechanically reinforced to enable them to stand up to their high internal pressure.

Preferred embodiments of the present invention provide a lead storage battery whose electrolyte is not so limited and which evolves little gas.

SUMMARY OF THE INVENTION

The present invention provides a lead storage battery comprising a container closed by a lid and containing an acid electrolyte together with a block of positive plates, negative plates and separators, wherein the said block is tightly packed in a case which is immersed in the electrolyte and which has openings in its walls which are in close contact with end ones of said plates. The edges of these wall openings are connected to their corresponding end plates in a sealed manner, by any appropriate means such as a seal ring or a fillet of flexible adhesive material. If the openings of any one wall are grouped in a single zone of that wall, then the periphery of the zone may be connected to the corresponding plate in a sealed manner.

This arrangement tends to set up a forced circulation of oxygen over the negative electrodes, particularly when the end electrodes are negative electrodes, and thus favours the reduction of the oxygen.

BRIEF DESCRIPTION OF THE DRAWING

An embodiment of the invention is described by way of example with reference to the accompanying drawing which is a schematic perspective view of a lead-acid storage battery.

DESCRIPTION OF THE PREFERRED EMBODIMENT

The storage battery comprises a container 1 of plastics material closed by a lid 2 also of plastics material and provided with two terminals 3 and 4 and a vent-cap 8. The container 1 contains acid electrolyte up to a level referenced 5 and in the same quantity as would be used in an ordinary battery of the same capacity.

A block formed of positive plates, negative plates and separators is very tightly packed into a case 10 which is immersed in the electrolyte. The outer side walls of the case, of which only the wall 11 is shown, have openings 12 revealing the end plate 20 of the block, which is preferably a negative plate. The edge of each wall opening is connected to the negative plate 20 by a seal ring or adhesive fillet 13 which prevents gas from passing between the plate 20 and the wall of the case before escaping via the openings 12.

The side walls of the case 10, such as the wall 11, are provided with vertical ribs 14 which, together with the inner face of the container 1, define circulation channels for the excess gases. Connection posts 16 and 17 leading to the terminals 3 and 4 pass through the upper wall 15 of the case 10 in a sealed manner. A tube 6 closed by a cap 7 is capable of putting the interior of the case in communication with the atmosphere. When the battery is being filled with electrolyte, it is advantageous to remove the cap 7 to facilitate the escape of air. Complete filling of the case with electrolyte can be performed more rapidly directly via the tube 6.

The gases evolved during electrochemical reaction pass over the negative plates before leaving via the openings 12. A larger quantity of oxygen than in an ordinary battery is thus reduced and the evolution of hydrogen is diminished while the capacity of the battery is nonetheless conserved. Since oxygen has a tendency to rise into the upper portion of the case 10, the openings 12 may be provided towards the lower part of the case. The oxygen can thus come into contact with a larger part of the active surface of the negative plates.

Naturally the invention is not limited to the example described above. In another embodiment which is simpler to manufacture, the ring providing the seal between the case 10 and the end plate 20 can be disposed around the perimeter of the zone in which all the openings are made, rather than around each opening 12.

To avoid long-term crumbling of the active material from the negative end plates, it is advantageous for the openings to be of small size. It is also preferable to have as large a ratio between the area of the openings and the area of the end plates as is compatible with a strong case and a gas-tight seal between the case and the end electrodes. This ratio may lie between 0.4 and 0.6.

Excellent results have thus been obtained by using a case having its walls pierced with 60 circular holes per wall, the holes being of 12 mm diameter and being distributed evenly over a zone lying within the zone in which the negative end plates bear on the walls. The area of the openings is 67 $cm^2$ for a negative end plate area of 152 $cm^2$, giving a ratio of 0.44. The sealing may be provided by means of a ring of flexible plastics surrounding the pierced zone.

Also, the vertical ribs 14 can be replaced by a porous separator sheet compressed between the container 1 and the case 10. This sheet, while still allowing the excess gases to circulate, retains the active material of the end plate 20 which might otherwise crumble out through the openings 12.

Example : The performance of a storage battery in accordance with the invention has been compared with that of an ordinary storage battery, each battery comprised four positive plates, five negative plates and the same quantity of electrolyte. Both these batteries had a capacity of 30 Ah. Their weight losses and their rates of gas evolution during overcharging at constant current were measured to check on the quantities of water consumed. Putting I (in amps) for the overcharging current and r (in per cent) for the ratio between their rates of water consumption, the following results were obtained :

| $I$ (A) | 0.03 | 0.15 | 1.15 | 3 |
|---|---|---|---|---|
| $r$ % | 3 | 3 | 3 | 10 |

In order to further diminish the evolution of gas, other known methods could be used : the use of plates whose grids are of a lead alloy that is poor in antimony, or even without antimony; porous separators; a vent-cap set to open at a low pressure; etc.

Advantageously highly porous separators will also be used, for example in the form of a felt of non-woven polyester fibres filling the spaces between the plates. In other words the separators press against two facing plates over their entire facing surfaces.

Such porous separators ensure a better retention of the sulphuric acid which leads to a greater area of exchange between adjacent plates and thus to a better discharge. Also they counteract the tendency of the gasses to rise and thus they favour the contact of the said gasses with the plates.

Naturally the invention is not limited to the examples described herein.

What is claimed is:

1. A lead storage battery comprising; a container closed by a lid and containing an acid electrolyte together with a block of positive plates, negative plates and separators, the improvement wherein said block is tightly packed in a case which is immersed in the electrolyte and said case having walls and openings in said walls and said walls at said openings being in close contact with end ones of said plates of said block.

2. A battery according to claim 1, wherein the edges of said wall openings are connected to corresponding end plates in a gas-tight manner by means of seal rings.

3. A battery according to claim 1, wherein the said openings of any one wall of the case are grouped in a single zone of that wall, and the periphery of each single zone is connected to the corresponding end plate in a gas-tight manner by means of a seal ring.

4. A battery according to claim 3, wherein the said zone includes an evenly distributed plurality of small openings.

5. A battery according to claim 1, wherein the ratio of the area of the openings of one wall to the area of its corresponding end plate lies between 0.4 and 0.6.

6. A battery according to claim 1, wherein the separators disposed between the plates are very porous and fill the spaces between the plates.

7. A battery according to claim 6, wherein the separators are felts of non-woven polyester fibres.

8. A battery according to claim 1, wherein the said end plates are negative plates.

9. A battery according to claim 1, wherein the outer face of each of the said walls of the case formed with openings are covered, at least at the level of the said openings, with an insulative gas-permeable sheet.

10. A battery according to claim 1, wherein connecting posts for the battery terminals pass through a wall of the said case in a sealed manner.

11. A battery according to claim 1, wherein the said case is in communication with a gas removal pipe that passes through said lid and is closed by a cap.

12. A battery according to claim 1, wherein the edges of said wall openings are connected to corresponding end plates in a gas-tight manner by means of a fillet of flexible material.

13. A battery according to claim 1, wherein said openings of any one wall of the case are grouped in a single zone of said wall, and the periphery of each single zone is connected to the corresponding end plate in a gas-tight manner by means of a fillet of flexible material.

* * * * *